Nov. 3, 1942.  H. P. PHILLIPS  2,300,519
PISTON RING ASSEMBLY
Filed April 1, 1940

INVENTOR.
HAROLD P. PHILLIPS
BY Earl D. Chappell
ATTORNEYS

Patented Nov. 3, 1942

2,300,519

UNITED STATES PATENT OFFICE 2,300,519

PISTON RING ASSEMBLY

Harold P. Phillips, Hastings, Mich., assignor to Hastings Manufacturing Company, Hastings, Mich., a corporation of Michigan Application April 1, 1940, Serial No. 327,162

2 Claims. (Cl. 309—44)

This invention relates to improvements in piston ring assemblies.

The main objects of this invention are:

First, to provide an improved composite piston ring or piston ring assembly for internal combustion engines which has features rendering it highly efficient during its initial wearing-in period or in the event of failure of the lubricating system after such wear-in period.

Second, to provide a piston ring assembly which provides an effective coating for the cylinder and the main piston ring element of lubricating metal, sealing or filling minute recesses and irregularities in both and thereby reducing wear and reducing their frictional resistance and wear.

Objects relating to details and economies of the invention will appear from the description to follow. The invention is defined and pointed out in the claims.

An intensive study of internal combustion engines and the action of piston rings in the cylinders thereof indicates the desirability, particularly in the case of a worn cylinder, of employing at least one ring or ring assembly on each piston which is capable of depositing a metallic coating or plating on the cylinder wall during the early stages of operation thereof, which coating or plating may be picked up by other piston ring elements, preferably associated with the depositing element to thereby seal up recesses and irregularities in the cylinder wall and outer ring periphery and produce an effective sealing engagement of the ring with the wall. In my copending application, Serial No. 302,858, filed November 4, 1939, I illustrate and describe a composite ring designed for this purpose, in which an annular split expansible insert of relatively soft material, such as brass, or bronze, is disposed in a groove in a carrier element of cast iron, for example. The present invention concerns an improvement in that ring, in that a thin split expansible element of relatively soft material, adapted to deposit a coating or film of the type described, is associated above, below or both above and below a further cast iron compression or scraper ring element of solid section, which maintains the first named member or members in position in the compression groove, and is adapted to engage the cylinder wall following initial wearing of said element. Such an assembly has valuable features both structural and functional, over and above that described in my copending application identified above, which will be referred to in the description to follow.

Preferred embodiments of the invention are illustrated in the accompanying drawing, in which.

Figure 1:
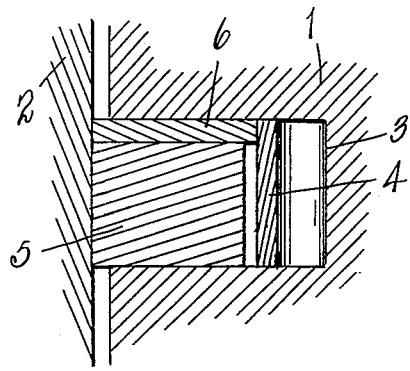
Fig. 1 is an enlarged fragmentary section illustrating my improved ring assembly in operative relation in the compression ring of an internal combustion engine and to a cylinder, the parts being shown in the relative relation occupied thereby when the assembly is installed.

It will be understood that in the accompanying drawing no attempt is made to show the parts in their relative proportions, the parts being enlarged and shown in such proportions as will clearly bring out the relation thereof.

In the accompanying drawing, 1 represents the piston of an internal combustion engine and 2 the cylinder. The piston would commonly be provided with a plurality of piston ring grooves but only one groove 3 is illustrated, this being a compression ring groove.

The assembly of my invention in the embodiment illustrated comprises the expanding spring 4 of suitable type, the main piston ring member 5 and the auxiliary or supplemental piston ring member 6.

The main piston ring member 5 is commonly and preferably formed of cast iron and is split and inherently expansible. The element or member 6 is a thin split expansible member and is formed of relatively soft lubricating metal such as brass, bronze, zinc or the like and is adapted for frictional contact with the cylinder wall to deposit a thin film or plating of lubricating metal thereon thereby filling up minute recesses and irregularities therein and also providing a good surface for the piston ring. The main piston ring by transfer from the cylinder wall also becomes coated with the friction reducing or lubricating metal coating and thus provides for a highly desirable surface both on the cylinder wall and on the main ring member. I have illustrated this coating or plating at 7 and have not attempted to illustrate the coating on the ring element 5.

Figure 2:
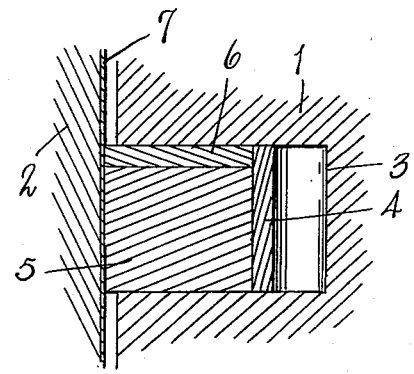
Fig. 2 is a view similar to Fig. 1 illustrating the condition and relation of the parts following the wearing-in period of operation and in the relation of normal operation after the wearing-in period.

The auxiliary ring member 6 is initially of a radial thickness considerably exceeding or greater than the radial thickness of the main member 5, and the expander spring is of such axial width as to act on both members after the wear-in period. However, during the initial wear-in period, it acts upon the member 6 only, thereby insuring that it is urged with considerable force against the cylinder wall and is quite rapidly worn down and in that wearing down deposits a coating of lubricating metal on the cylinder wall, this coating being indicated at 7. After the wear-in period, the parts are in the relation shown in Fig. 2.

The foregoing assembly enables a uniform coating from the soft section 6 to be deposited on the cylinder wall and the circumferential surface of the cast iron member 5, the soft section quickly wearing in and in fact becoming of less radial thickness than the cast-iron member. Gas pressure serves to urge the soft section against the cylinder wall in such case, inasmuch as the composite ring of my invention is primarily intended as a compression ring assembly serving to impart the metallic lubricant to the upper part of the cylinder wall where experience shows that it is needed most.

Figure 3:
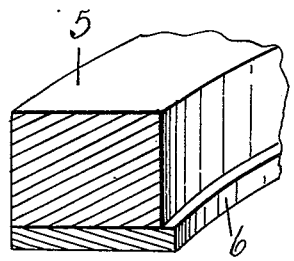
Fig. 3 is a fragmentary perspective view in section illustrating an alternative arrangement of the parts of the assembly.

In the modification shown in Fig. 3, the element 6 is disposed in the bottom or below the element 5. However, it is preferably disposed at the top.

Figure 4:
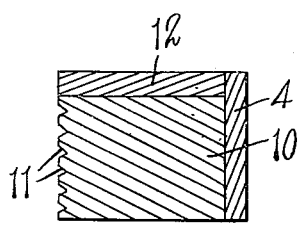
Fig. 4 is a view in section of another embodiment of the invention.

In the embodiment shown in Fig. 4, the main ring member 10 has a roughened quick wearing face indicated at 11, this face being provided to insure relatively quick wearing in of the main member and in that case the association auxiliary member 12 may with quite satisfactory results be initially of the same axial width as the main member 10. However, in any assembly I prefer to have the auxiliary member formed of relatively soft bearing metal, as stated, of a radial width exceeding that of the main member so that the expander acts thereon not only to increase the tension and consequent depositing of the lubricating coating but this also serves to provide a very quick sealing of the ring assembly.

It is recognized that the cast iron cylinder blocks vary greatly in their wearing quality and their ability to take a smooth wear resisting finish. Some have a very decided tendency to scuff and my improved piston ring assembly is especially valuable for such conditions. However, it is valuable for any condition, and while primarily designed to produce a desirable condition during the initial wearing-in of the ring assembly it is also valuable in the event of the temporary failure of the lubricating system as the lubricating metallic element will prevent such scuffing and scoring as might render it necessary to rebore the cylinder.

It will be understood that the element 6 is preferably of thin ribbon-like stock and I have found it satisfactory to use a stock having an axial thickness of approximately 25% of the cylinder wall contacting surface or of the order of .020 to .030 of an inch in thickness.

I have illustrated and described my improvements in embodiments which I have found very practical. I have not attempted to illustrate certain other embodiments or adaptations as it is believed that this disclosure will enable those skilled in the art to embody or adapt my improvements as may be desired.

Having thus described my invention, what I claim as new and desire to secure by Letters Patent, is:

1. A piston ring assembly comprising a split expansible cast iron main ring member initially and subsequently engageable with a cylinder wall throughout the full outer surface thereof, a thin split expansible auxiliary ring member of relatively soft non-ferrous ribbon-like lubricating metal such as bronze disposed in side by side relation to said main ring member in contact with the cylinder wall and being initially of a radial width exceeding the radial width of the main ring member, and an inner expanding spring of such axial width as to adapt it for coaction with both said ring members but initially acting only on the auxiliary ring member whereby said auxiliary ring is subject to relatively rapid wear during its initial use to deposit a film of metal on a cylinder wall through its frictional wearing-in coaction therewith.

2. A piston ring assembly comprising a split expansible main ring member of relatively hard wear resisting material, a thin split expansible auxiliary ring member of relatively soft non-ferrous lubricating metal disposed in side by side relation to said main ring member and being initially of a radial width exceeding the radial width of the main ring member, and an expander adapted for coaction with both said ring members after the auxiliary ring member is worn to the radial width of the main ring member but initially acting only on the auxiliary member, said auxiliary member being subject to relatively rapid wear during its initial use to deposit a film of metal on a cylinder wall through its frictional wearing-in coaction therewith.

HAROLD P. PHILLIPS.